Nov. 29, 1960  J. H. WERTHEIM  2,962,380
RADIATION STERILIZATION OF FLUID FOOD PRODUCTS
Filed Oct. 8, 1956

INVENTOR.
JOHN H. WERTHEIM
BY Kenway, Jenney, Witter
+ Hildreth
ATTORNEYS

2,962,380
RADIATION STERILIZATION OF FLUID FOOD PRODUCTS

John H. Wertheim, Brookline, Mass., assignor to Research Corporation, New York, N.Y., a corporation of New York Filed Oct. 8, 1956, Ser. No. 614,587

4 Claims. (Cl. 99—217)

This invention relates to the treatment of material with ionizing radiation and particularly to the sterilization of liquid food products by means of ionizing radiations.

The sources of ionizing radiation include two general classes: accelerators, such as the Van de Graaff generator and the betatron, and isotopic sources, such as fission products from nuclear reactors. Ionizing radiations, either beta (cathode), or gamma (X-ray) radiation, may be utilized to sterilize materials through exposure to a radiation dosage sufficient to kill the microorganisms therein.

This manner of food sterilization offers several practical advantages. Packaging during and after treatment is simplified in that container walls do not have to be rigid to withstand high pressures incident to steam pressure sterilization. In addition, thermal processes affecting the consistency and flavor of the product may be avoided.

However, in the sterilization of food products with ionizing radiations deleterious side reactions have heretofore been produced. These side reactions may include changes in color, taste and odor which may render the sterilized food unpalatable. It is believed that this is largely brought about by the ionizing radiations which produce free radicals of both the oxidative (OH or $HO_2$) and the reductive types (H). These radicals are believed to react with some components of the food to produce minute quantities of compounds, largely carboxyls and mercaptans, which are the sources of off-odor and off-flavor characteristics.

Attempts to avoid or reduce these side reactions have included irradiation in the frozen state, or the addition of free radical acceptors before irradiation. These methods have not been completely successful, particularly with liquid food products which are highly radiosensitive. In addition, the former method requires special processing, handling and storage equipment. The latter method involves selection of free radical acceptors which should not contaminate the food, so as to meet the rigid standards of Government supervisory agencies.

Therefore, an object of the present invention is to provide a sterilized food product having unimpaired odor, color and taste characteristics.

Another object of this invention is to provide means of avoiding expensive handling or preparation procedures such as freezing of foods.

A further object of the invention is to reduce the cost of packaging and storing food products.

Still another object is to provide a sterilizing process in which no additive which might contaminate the food is required.

In accordance with the aforementioned objects, the subject invention involves the process whereby fluid food products are subjected to ionizing radiations of dosage sufficient to sterilize the food, and at the same time or immediately thereafter subjecting the irradiated product to such conditions of temperature and pressure that the partial pressures in the fluid are greater than that of the surrounding environment. In other words, the product is boiled simultaneously with the irradiation process or immediately thereafter, and volatile components produced by the ionizing radiation are evaporated. In order that no impaired taste characteristics are produced by high temperature, the boiling process takes place under conditions of reduced pressure.

The principles of the invention may be utilized in various embodiments. In a preferred arrangement, these include beta irradiation with simultaneous boiling, beta irradiation with subsequent boiling with or without incorporation of a recirculation system, gamma irradiation with simultaneous boiling and gamma irradiation with subsequent boiling.

Figure 1:
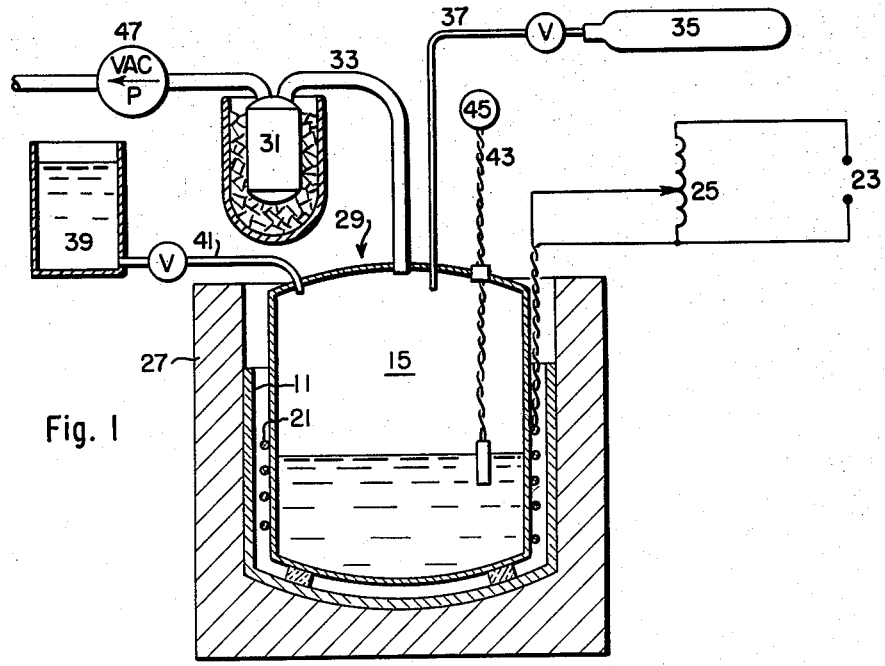
Fig. 1 is a schematic drawing of apparatus used experimentally for gamma irradiation and simultaneous boiling.

Fig. 1 shows an experimental arrangement utilizing gamma irradiation and simultaneous boiling to successfully sterilize liquid food without producing deleterious side reactions.

Referring to Fig. 1, the radiation source 11 is a hollow cylinder of radioactive material, such as cobalt-60 ($Co^{60}$), an artificial fission product source of kilocuric intensity which provides gamma radiation at the rate of approximately 5600 rep./min. A rep. (roentgen equivalent physical) is 93 ergs of radiation energy absorbed per gram. The vessel 15 which contains the food to be treated fits within the cobalt cylinder 11. A heating element 21 in the form of electric resistance wire is wound spirally about the vessel 15. Connected to heating element 21 is a power source 23 and means 25 for adjusting the current, such as an autotransformer. Surrounding the radiation source 11 is a protective lead shield 27. The upper portion 29 of the vessel 15 has provision for several mechanical and electrical connections. The vessel is connected to a condensing apparatus 31 such as Dry Ice condensers by means of tube 33, also to an inert gas supply 35 (nitrogen or hydrogen for example) by capillary tubes 37, and then to a source 39 of make up water by tube 41. Electrical thermocouple connection 43 is also provided to a potentiometer 45 to measure the temperature of the boiling liquid. A vacuum pump 47 is connected into the condensing apparatus 31.

For the sterilization of raw milk, the system of vessel 15 and condensing apparatus 31 is pumped to a vacuum of the order of 10–11 mm. Hg to maintain a temperature between 10–15° C. which, for a boiling time of six (6) hours, is sufficiently below the melting point of butter fat to prevent separation of the fat. A quantity of the fluid to be sterilized is introduced into vessel 15 (boiling capacity 180 ml.) and sufficient current sent through heating element 21 to maintain boiling at about 12° C.

During the 6 hour period necessary to collect a dose of $2\times10^6$ rep. the evaporation rate was about 150 ml./hr. and an equal amount of distilled makeup water was introduced from source 39 through tube 41 to the vessel 15. At the same time inert gas from supply 35 is introduced into vessel 15 through capillary tube 37 at a rate of 3–4 ml./min. (at STP) to maintain constant boiling.

Raw milk treated as outlined above was tested by plating the milk in an agar suspension on Petri dishes and by storage at room temperature and at 37° C., and was found to be sterile. No adverse flavor developed and the taste was that of an acceptable commercial grade of milk.

Other food liquids such as fruit juices and chocolate drink have also been sterilized by this process and apparatus without production of adverse flavor, taste or odor characteristics.

The rate of evaporation during sterilization is dependent on the product. For example, raw whole milk required an evaporation rate of about 150 ml./hr., while non-fat skim milk required only a rate of 60 ml./hr. due to the development of more, or different, off-flavor components from unsaturated fats than from sugar and protein only.

For double or triple strength milk, i.e. evaporated milk, the process may include introducing at the start raw milk instead of make up water until the required concentration is attained at which point the process proceeds as heretofore described.

The process has further utility, for example, for the concentration of orange juice. In this case the first portion of the condensate containing the bulk of the orange flavor is retained and reintroduced at the end of the process to improve the natural flavor of the product.

Other sources of radiation may be used on a commercial scale. These may include a fission product source of high radiation intensity (similar to that described in Nucleonics, May 1954, vol. 12, pp. 14–20, in an article by Loeding, Pefkus, Kasui and Rodges), radiation from a nuclear reactor (with appropriate shielding to eliminate radioactive contamination from alpha and deuteron radiation) and cathode ray sources such as Van de Graaff generators. The utilization of radiation sources for commercial purposes requires an available high dosage rate. For example, a 3 m.e.v. Van de Graaff generator with 500 watts power having a beam diameter of 10 inches can subject a sample (specific gravity 1), 1 cm. thick to a dose of $2 \times 10^6$ rep. in 10 seconds. This may be contrasted to the dose rate of 5600 rep./min. provided by the radioactive cobalt source. The effect of such procedures is to substantially shorten distillation time, as well as achieving economy of equipment.

The invention may be practiced with boiling carried out simultaenously with exposure to radiation, or with boiling immediately after irradiation. The delay between radiation and boiling is preferably not greater than 30 seconds and should not exceed 1 minute to prevent development of oxidation chains.

Figure 2:
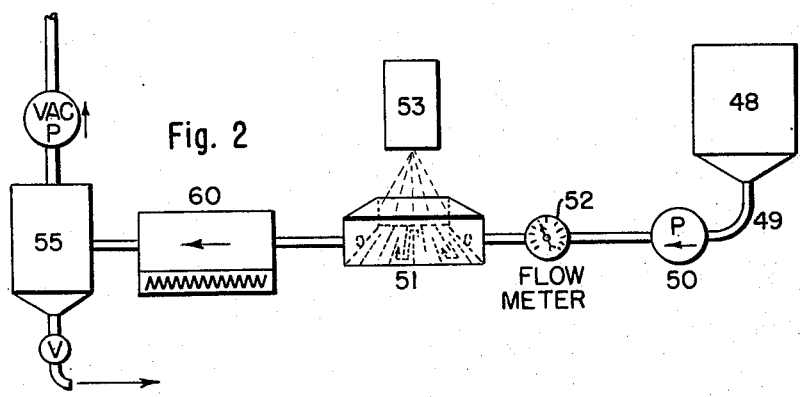
Fig. 2 is a schematic drawing of apparatus for irradiating liquid food products, with subsequent boiling.

For treatment of liquid food products on a continuous basis, a Van de Graaff generator system as shown in Fig. 2 may be utilized. In this embodiment, the liquid to be sterilized is introduced into pipe 49 from a storage tank 48 and circulated by pump 50 through the flow meter 52 to the irradiation chamber 51 which is disposed in the path of radiation from the Van de Graaff generator 53. The irradiation chamber preferably confines the liquid to a stream cross-section that provides relatively uniform radiation dosage for all portions of the liquid during traversal of the chamber. From the irradiation chamber the liquid passes into the heater 60 and flash chamber 55 where conditions of temperature and pressure exist to boil the irradiated liquid at a temperature low enough to avoid flavor changes due to heat. The flash chamber 55 may be similar to those presently used in the dairy industry to deodorize milk. The process utilized may involve a single pass radiation process if the generator can produce a sterilizing dosage in one pass, or the system may provide recirculation of the liquid until a dosage is received sufficient to kill microorganisms therein. To increase the dosage received in a single pass a spiral path may advantageously be incorporated in the radiation chamber 51.

Figure 3:
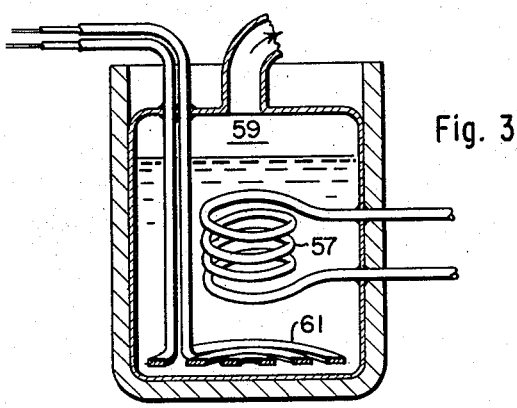
Fig. 3 is a schematic drawing of other apparatus for simultaneous irradiation and boiling of liquid food products.

If simultaneous boiling and irradiation is desired, the radiation sources may be placed within the boiler, as shown in Fig. 3. Tubular radiation sources 57 such as the illustrated conduit coils for the passage of liquid fission products, or radioactive rods, both being properly shielded, are placed within a boiler 59 having construction and heating features well known in the art. Circulation of the liquid to be sterilized may be accomplished by the boiling process or by an external pump and piping system. In the event the heat supply from the fission products is insufficient for the boiling process, supplemental steam pipes 61 to provide the needed heat may be included within the boiler.

It has also been found advantageous in some treatments, and for milk particularly, that the distillation rate may be reduced and economy of equipment effected if the process is carried out at a somewhat higher temperature. Thus, the process may include boiling the liquid food at a temperature of about 35–40° C. for approximately 1 hour.

While the invention has been illustrated by specific examples, these are not to be considered as limiting the invention. What is comprehended is the treatment of liquid food products by irradiation under conditions of somewhat elevated temperature and reduced pressure sufficient to effect boiling, and the particular conditions to bring this about will naturally vary with the food product involved.

What is claimed is:

1. A process for producing a sterilized fluid food product relatively free of off-flavor constituents, which comprises exposing the food product to ionizing radiation while substantially simultaneously subjecting the product to a pressure substantially below atmospheric and applying heat to effect boiling of said product at a pressure substantially below atmospheric and at a temperature substantially below the normal boiling point of said product under atmospheric pressure, and concurrently removing the volatile products.

2. A process for producing sterilized milk that is relatively free of off-flavor constituents, which comprises exposing the milk to ionizing radiation while substantially simultaneously subjecting the product to a pressure substantially below atmospheric and applying heat to effect boiling of the milk at a reduced pressure such that the milk boils below approximately 40° C. and concurrently removing the volatile products.

3. A process for producing sterilized milk that is relatively free of off-flavor constituents, which comprises exposing the milk to ionizing radiation of an intensity in excess of about $2 \times 10^6$ rep. while substantially simultaneously subjecting the milk to a pressure substantially below atmospheric and applying heat to effect boiling at sub-atmospheric pressure such that the boiling point is below approximately 40° C., and concurrently removing the volatile products.

4. A process for producing sterilized milk that is relatively free of off-flavor constituents, which comprises exposing the milk to ionizing radiation of an intensity in excess of approximately $2 \times 10^6$ rep. and within approximately one minute following the inception of irradiation subjecting the milk to a pressure substantially below atmospheric and applying heat to effect boiling at a temperature below approximately 40° C. and maintaining the boiling for substantially the duration of the irradiation treatment while concurrently removing the volatile products.

References Cited in the file of this patent

UNITED STATES PATENTS 1,960,012   Jacobsen _____ May 22, 1934

OTHER REFERENCES

Food Technology, March 1953, pages 109 to 115.
Refrigerating Engineer, January 1953, page 57.
J. American Dietetic Association, vol. 30, No. 10, October 1954, page 974.
Journal of The American Dietetic Association, vol. 30, No. 10, October 1954, pages 973 to 975.